(12) United States Patent
Duncan (10) Patent No.: US 7,797,527 B2
(45) Date of Patent: Sep. 14, 2010

(54) COMPUTING DEVICE DEPLOYMENT USING MASS STORAGE DEVICE

(75) Inventor: Robert Duncan, San Jose, CA (US)

(73) Assignee: Wyse Technology Inc., San Jose, CA (US)

( * ) Notice: Subject to any disclaimer, the term of this patent is extended or adjusted under 35 U.S.C. 154(b) by 388 days.

(21) Appl. No.: 11/798,984

(22) Filed: May 18, 2007

(65) Prior Publication Data
US 2007/0226481 A1 Sep. 27, 2007

Related U.S. Application Data

(62) Division of application No. 10/779,647, filed on Feb. 18, 2004, now Pat. No. 7,237,103.

(51) Int. Cl.
G06F 15/177 (2006.01)
G06F 9/00 (2006.01)
G06F 12/00 (2006.01)
G06F 13/00 (2006.01)
G06F 11/00 (2006.01)
G06F 7/04 (2006.01)

(52) U.S. Cl. ............... 713/2; 713/1; 713/100; 711/103; 711/170; 714/36; 726/21; 726/27

(58) Field of Classification Search ............ 713/1, 713/2, 100; 711/103, 170; 714/36; 726/21, 726/27
See application file for complete search history.

(56) References Cited

U.S. PATENT DOCUMENTS

| 6,446,203 | B1 * | 9/2002 | Aguilar et al. ............... 713/2 |
| 6,654,797 | B1 | 11/2003 | Kamper |
| 6,920,553 | B1 * | 7/2005 | Poisner ..................... 713/2 |
| 7,039,796 | B2 | 5/2006 | Ballard |
| 7,050,859 | B1 * | 5/2006 | Govindaraj et al. .......... 700/1 |
| 7,117,376 | B2 * | 10/2006 | Grawrock ................. 380/277 |
| 2003/0233533 | A1 | 12/2003 | Avraham |

FOREIGN PATENT DOCUMENTS

EP 1 271 332 A2 1/2003
WO WO 03/042847 A1 5/2003

* cited by examiner

*Primary Examiner*—Stefan Stoynov
(74) *Attorney, Agent, or Firm*—McDermott Will & Emery LLP (57) ABSTRACT

Computing device deployment and configuration using a mass storage device is provided. A generic computing device is provided to a customer or end user. A mass storage device is used to distribute configuration information to the generic computing device. The configuration information includes customer-specified or ordered software applications or other features. The configuration information can also include updates to the computing device system software. The customer or end user couples the mass storage device to the generic computing device in order to load the configuration information into the computing device. After the configuration information is loaded, the computing device is configured for the customer's use. Further features, such as creating customized images, are also provided.

24 Claims, 10 Drawing Sheets

COMPUTING DEVICE DEPLOYMENT USING MASS STORAGE DEVICE

CROSS-REFERENCE TO RELATED APPLICATION

The present application is a divisional application of U.S. patent application Ser. No. 10/779,647 entitled "COMPUTING DEVICE DEPLOYMENT USING MASS STORAGE DEVICE," filed on Feb. 18, 2004, and issued as U.S. Pat. No. 7,237,103, the disclosure of which is hereby incorporated by reference in its entirety for all purposes.

STATEMENT REGARDING FEDERALLY SPONSORED RESEARCH OR DEVELOPMENT

Not applicable.

FIELD OF THE INVENTION

The present disclosure relates generally to computing device deployment, and more particularly, to using a portable mass storage device to image the memory of a computing device for customization or upgrading.

BACKGROUND OF THE INVENTION

Computing devices are often designed to perform a variety of tasks in a variety of configurations. Because of this flexibility, computing devices commonly require some customer-specific configuration in order to meet the customer's needs. A configured computing device includes customer-specific application loads or other configuration information. One problem in the distribution of computing devices is the difficulty of maintaining an inventory of configured computing devices. That is, storing configured computing devices can be a difficult and costly endeavor because of the multitude of customer needs.

One conventional way of addressing this problem is to load the computing device with a standard configuration at the time of manufacture. A standard configuration includes applications or customizations that the customer can specify at the time of ordering. A limitation of this approach, however, is the degree to which standard configurations can encompass the needs of enterprise customers. Although many home users may have similar configuration requirements, enterprise users often require more specific configurations. Further, a standard configuration can become outdated or in need of software updates while the computing device is stored in a warehouse or waiting for deployment at the customer's premises.

To address these challenges, system installers and enterprises are increasingly using images in the deployment of computing devices to customers or end users. An image represents a software configuration that can be loaded onto a computing device in order to configure the computing device with customer-specific information, such as applications or operating systems. Conventionally, images are used to replicate an established system configuration to a number of similar computing devices. In a personal computer, for example, an image typically replicates the hard drive contents of the established system. Images can be used to reduce the amount of time required to install and to configure individually each of a number of computing devices.

The use of images enables the computing device manufacturer to store generic computing devices that can be easily configured at the time of deployment. In some computing environments, such as server-based computing using thin clients, images can be distributed from a networked server. Thin clients typically write an image into a memory device, such as flash memory, because they lack hard drives or other secondary storage devices. One problem with distributing images from a server, however, is that network configuration is often required for the computing device to communicate with the server. For an initial customer installation, the computing device may fail to connect with the server because it does not have the proper network configuration information for the customer's network.

Further, the customer's premises may lack a high speed connection to a server from which an image can be downloaded. While the computing device may be connected to the server via a slow data rate connection, such as a modem over an analog telephone network, downloading an image via such a connection may be challenging. Although the slow data rate connection may be suitable for operating the computing device, it may take significant time for the computing device to download the image, during which time the computing device cannot be used for other workloads. In a thin client, for example, an image may require 16 megabytes or more of data to be transferred from the server.

In another conventional technique for deploying thin clients, a compact disc read only memory (CD-ROM) media is shipped to customer's premises. Thin clients typically do not have CD-ROM devices, so a CD-ROM drive is typically shipped as well in order to read the media. The CD-ROM drive can be locally connected to the thin clients. A drawback of this approach, however, is that shipping the CD-ROM media and drive to the customer can be expensive. Another disadvantage is that user intervention is typically needed for the computing device to boot off the CD-ROM or to update its configuration from a CD-ROM image. Further, CD-ROMs may have slow data throughput and high seek latencies. Thus it may take significant time for the computing device to read the image from the CD-ROM.

What is needed is a technique for providing configured computing devices that does not require network delivery of images or costly delivery of hardware to the customer's premises. What is further needed is a technique for creating images that can be used to configure generic computing devices with customer-specified or ordered features.

SUMMARY OF THE INVENTION

The present disclosure includes systems and methods for deploying computing devices, such as thin clients and personal computers, to customers or end users. In one aspect, a data processing system includes a computing device and a storage device. The storage device can be an electronic memory, such as a flash memory-based universal serial bus (USB) mass storage device. The electronic memory includes a system image or other configuration information for the computing device. The electronic memory can be coupled to an expansion port of the computing device. The contents of the electronic memory are used to configure the operation of the computing device or the software applications loaded thereon.

In another aspect, a method for imaging a computing device from an attached storage device is provided. A generic computing device is distributed to the customer's premises. The generic computing device includes a minimal set of functionally in order to access the attached storage device. The generic computing device executes boot code to acquire a system image from the attached storage device. The system image is then written to an internal flash memory or other component of the computing device. The image can provide additional or customer-specific functionality. The storage device may then be detached from the computing device. In another aspect, the image is executed from the attached storage device. In this case, the storage device remains attached to the computing device during normal operations.

In a further aspect, a method for creating a customized software image is provided. The method includes receiving a customer order and parsing the customer order for configuration data. The configuration data indicates which software components or modules the customer wants loaded onto the computing device. The configuration data can also indicate other aspects of how the customer wants the computing device configured. An image is built based on the configuration data and written to the storage device. The storage device can then be distributed to the customer or end user.

In a further aspect, a method for imaging a computing device from an attached storage device is provided. The method comprises the steps of determining whether to boot the computing device from the attached storage device; responsive to the determining, executing boot code on the computing device to acquire an image from the attached storage device; and booting the computing device using the acquired image.

In a further aspect, a method for providing customized software for a computing device is provided. The method comprises the steps of receiving a customer order for the computing device, parsing the customer order to determine configuration data, building an image using the configuration data, and writing the image to a storage device. The storage device is distributable to the customer.

In a further aspect, a system for imaging a computing device from an attached storage device is provided. The system comprises means for determining whether to boot the computing device from the attached storage device; responsive to the determining means, means for executing boot code on the computing device to acquire an image from the storage device; and means for booting the computing device using the acquired image.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE INVENTION

The present invention is now described more fully with reference to the accompanying figures, in which several embodiments of the invention are shown. The present invention may be embodied in many different forms and should not be construed as limited to the embodiments set forth herein. Rather these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

A. System Overview

Figure 1:
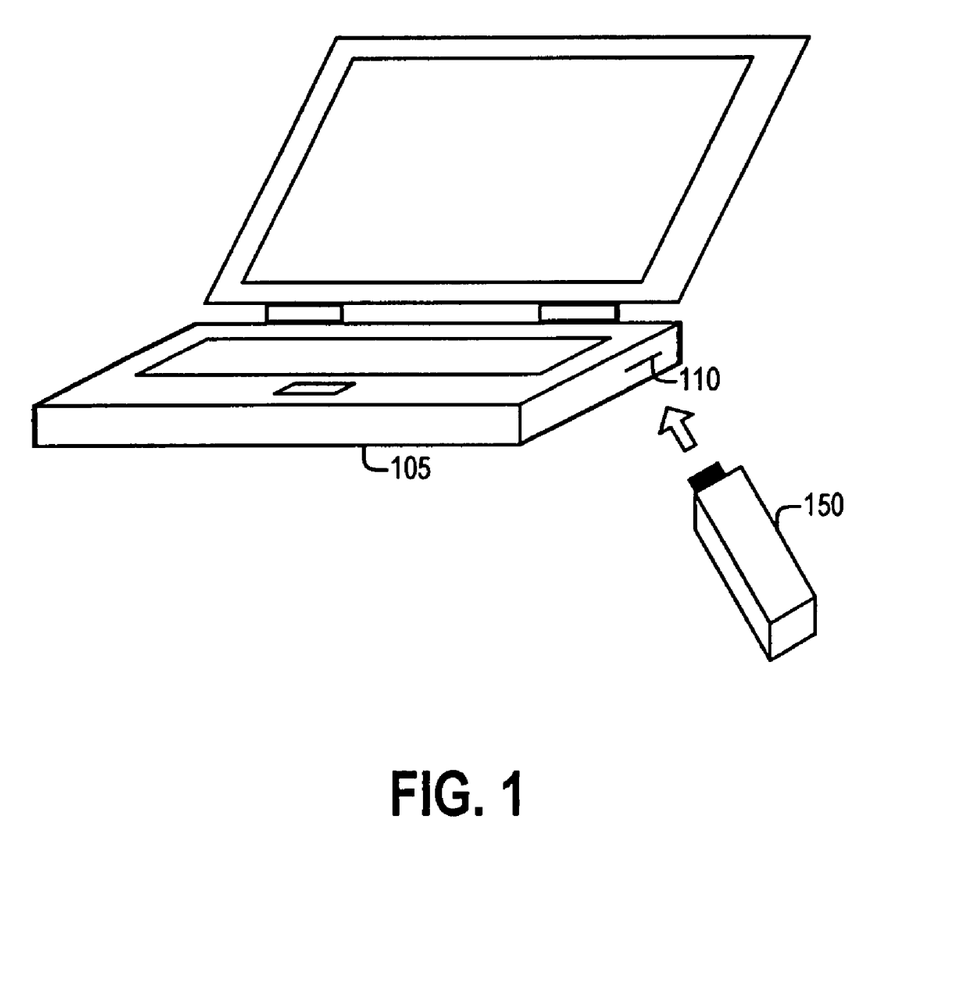
FIG. 1 is a diagram illustrating a computing system according to an embodiment of the present invention.

FIG. 1 is a diagram illustrating a computing system according to an embodiment of the present invention. The illustrated embodiment includes a computing device 105 and a storage device 150. The computing device 105 is a conventional computer, such as a workstation, server, or personal digital assistant. In one embodiment, the computing device 105 is a thin client, such as a Winterm 3125SE (which is commercially available from Wyse Technology Inc., San Jose, Calif).

The computing device 105 includes an expansion port 110. In one embodiment, the expansion port 110 is a universal serial bus (USB) port. The expansion port 110 enables accessory devices, such as the storage device 150, to be coupled to the computing device 105. In addition to data signal coupling, the expansion port 110 may provide electrical power for an accessory device coupled thereto.

The storage device 150 can be coupled to the expansion port 110 to communicate data with the computing device 105. The storage device 150 can be a conventional flash memory mass storage device, a compact flash storage device, a universal serial bus flash drive, an IEEE 1394 flash drive, a removable mass storage device, an electrically erasable programmable read-only memory (EEPROM), and the like. As one skilled in the art will appreciate, the storage device 150 physical and functional interfaces correspond with the physical and functional interfaces of the expansion port 110. In one embodiment, the storage device 150 is a USB mass storage device, such as a JumpDrive 2.0 Pro (which is commercially available from Lexar Media, Inc., Fremont, Calif.). Although any suitable storage device may be used in accordance with the present disclosure, advantages of the USB mass storage device include fast read/write speeds, high capacity, and compact, lightweight, and rugged packaging.

As one skilled in the art will appreciate, the storage device 150 can be coupled to the expansion port 110 directly or indirectly via another device, such as a hub or network element. For example, the storage device 150 may be coupled to the hub device, which is further coupled to the expansion port 110.

In an embodiment of the present invention, the storage device 150 includes data that provides configuration information for the computing device 105. This configuration information can be used to modify a generic computing device 105 into a configured system. For example, the storage device 150 may include an image that can be written to flash memory to provide customer-specific applications or system configuration for the computing device 105. In a thin client configuration, the image typically includes the operating system as well as application software. More specifically, the image may include program code for booting the computing device 105, for loading an operating system, and for executing software applications.

Of course, the storage device 150 may include configuration information in a variety of data structures or formats. More specifically, the data on the storage device 150 may be arranged as a monolithic image that represents most or all of the program code that is executable by the computing device 105 or the data may be arranged in a component or structured format, such as an extensible markup language (XML) file.

One advantageous aspect of the present invention is that the computing device 105 can be delivered to a customer's premises in a generic or non-configured state. At the customer's premises, the storage device 150 can be inserted into the expansion port 110 to provide configuration information. This configuration information can include customer-specific information, such as network parameters or customized software application loads. In one embodiment, the configuration of the computing device 105 does not require user-intervention beyond insertion or coupling of the storage device 150. The storage device 150 provides a portable, inexpensive, and reliable approach for configuring the computing device 105 with customized or updated software. The configuration process is described below in further detail.

Figure 2:
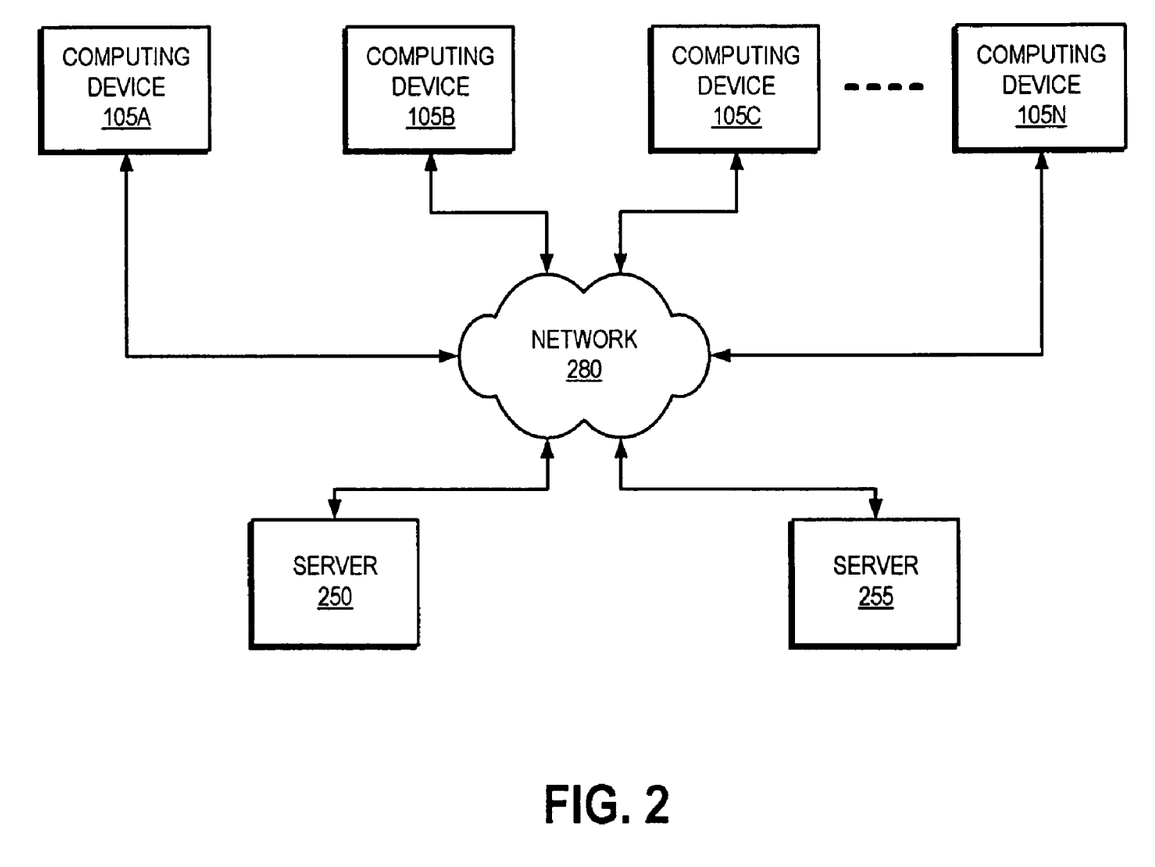
FIG. 2 is a diagram illustrating a network architecture according to an embodiment of the present invention.

FIG. 2 is a diagram illustrating a network architecture according to an embodiment of the present invention. The illustrated embodiment includes a plurality of computing devices 105A-N, a first server 250, a second server 255, and a network 280. The computing devices 105A-N are coupled to the network 280 in a conventional data networking topology. The computing devices 105A-N may also be coupled to the network 280 via other system or network entities, such as virtual private networking (VPN) devices, modems, and the like.

The network 280 represents a conventional local or wide area data network. The network 280 may use one or more suitable connection-oriented or connectionless communications protocols, such as Internet protocol (IP). The network 280, the computing devices 105A-N, and the servers 250, 255 may use circuit-switched or packet-based data transport.

In the illustrated system configuration, the computing devices 105A-N characterize thin client devices that are coupled to servers 250, 255. Servers 250, 255 may provide a variety of application or operating system services, such as file storage services, print services, or application services. In a server-centric computing embodiment, the servers 250, 255 execute software applications and export the display or interface to the computing devices 105A-N.

The servers 250, 255 may also provide configuration information to the computing devices 105A-N. This configuration information includes software updates in the form of images or other data files. For example, the computing devices 105A-N may include software applications that execute standalone or that interact with the servers 250, 255. Updates to these software applications can be made by receiving an image or data file from the servers 250, 255. The computing devices 105A-N can write the received image to a memory or storage device. One advantage of this configuration is that it enables a system administrator to update remotely a plurality of deployed computing devices 105A-N.

Further, the storage device 150 can be coupled to the servers 250, 255 to provide configuration information. The servers 250, 255 can read configuration information from the storage device 150 for configuring the servers 250, 255 as well as for distributing configuration information to the computing devices 105A-N via the network 280. More specifically, the storage device 150 can be distributed to the customer's premises with firmware images for the computing devices 105A-N. The storage device 150 can be coupled individually to each of the computing devices 105A-N in order to provide an update or configuration information. Also the storage device 150 can be coupled to the server 250. The server 250 can then distribute the update or configuration information to each of the computing devices 105A-N as appropriate.

B. Computing Device

Figure 3:
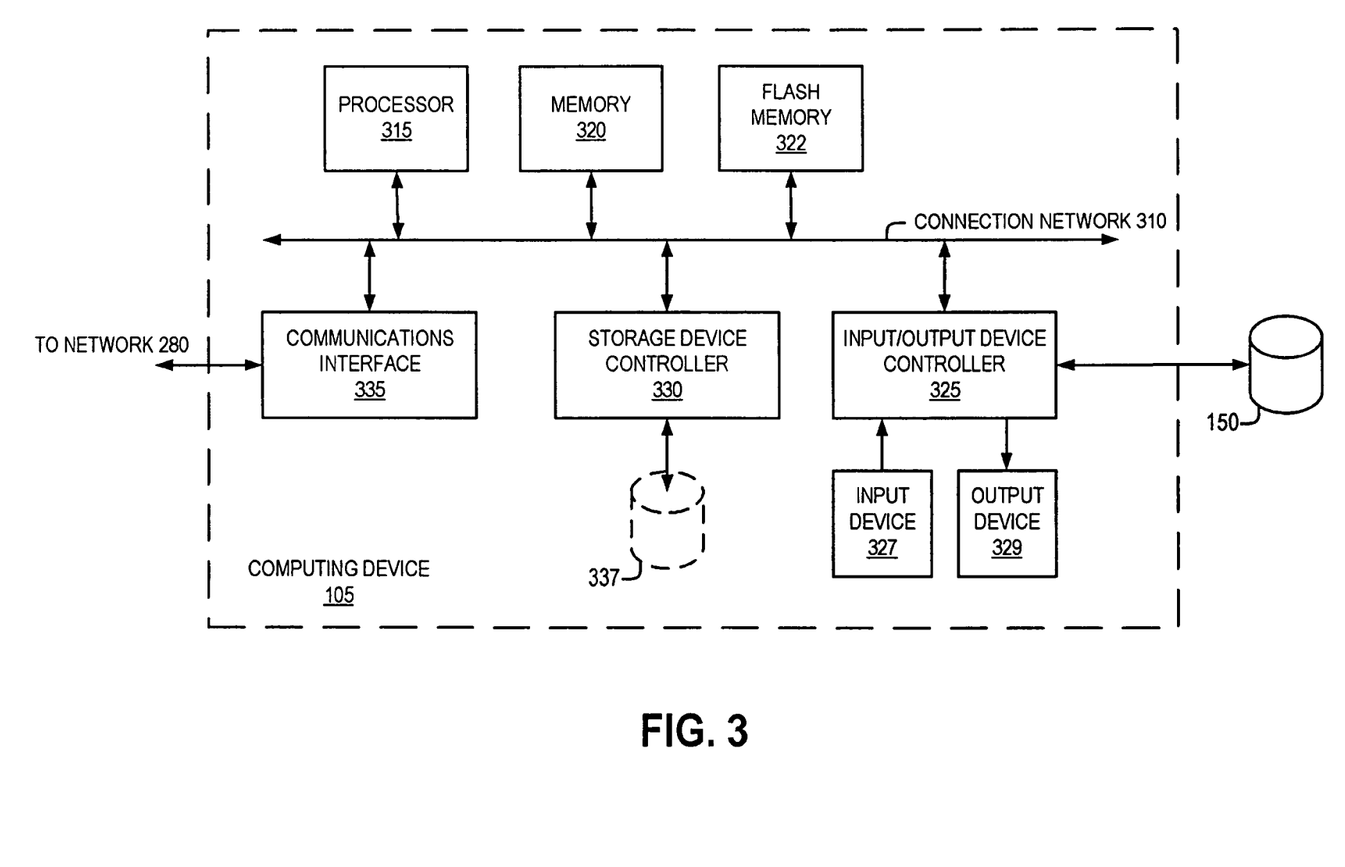
FIG. 3 is a block diagram of a computing device according to an embodiment of the present invention.

FIG. 3 is a block diagram of a computing device according to an embodiment of the present invention. In the illustrated embodiment, the computing device 105 includes a connection network 310, a processor 315, a memory 320, a flash memory 322, an input/output device controller 325, an input device 327, an output device 329, a storage device controller 330, and a communications interface 335. Also included is an internal storage device 337, which is optional in the illustrated embodiment.

The connection network 310 operatively couples each of the processor 315, the memory 320, the flash memory 322, the input/output device controller 325, the storage device controller 330, and the communications interface 335. The connection network 310 can be an electrical bus, switch fabric, or other suitable interconnection system.

The processor 315 is a conventional microprocessor. In one embodiment, the computing device 105 is portable and powered by a battery. In this instance, the processor 315 or other circuitry may be designed for low power operation in order to provide satisfactory runtime before requiring recharging or replacement of the battery.

The processor 315 executes instructions or program code modules from the memory 320 or the flash memory 322. The operation of the computing device 105 is programmable and configured by the program code modules. Such instructions may be read into memory 320 or the flash memory 322 from a computer readable medium, such as a device coupled to the storage device controller 330. In addition, instructions may be read into the memory 320 or the flash memory 322 from the storage device 150. In the illustrated embodiment, the storage device 150 is shown coupled to the input/output device controller 325. One skilled in the art will appreciate, however, that the storage device 150 may be coupled to any suitable interface of the computing device 105 that corresponds to the interface on the storage device 150.

Execution of the sequences of instructions contained in the memory 320 or the flash memory 322 cause the processor 315 to perform the method or functions described herein. In alternative embodiments, hardwired circuitry may be used in place of or in combination with software instructions to implement aspects of the disclosure. Thus, embodiments of the disclosure are not limited to any specific combination of hardware circuitry and software. The memory 320 can be, for example, one or more conventional random access memory (RAM) devices. The flash memory 322 can be one or more conventional flash RAM, or electronically erasable programmable read only memory (EEPROM) devices. The memory 320 may also be used for storing temporary variables or other intermediate information during execution of instructions by processor 315.

In one embodiment, the flash memory 322 includes an image of program code modules and user data. The program instructions associated with the program code modules are communicated to the processor 315 via the connection network 310. Program instructions may be executed directly from the flash memory 322 or communicated to the memory 320 before execution by the processor 315. For example, the flash memory 322 can include program instructions for booting the computing device 105 off the storage device 150 that is attached to the expansion port 110 of the input/output device controller 325.

The input/output device controller 325 provides an interface to the input device 327 and the output device 329. The output device 329 can be, for example, a conventional display screen. The display screen can include associated hardware, software, or other devices that are needed to generate a screen display. In one embodiment, the output device 329 is a conventional liquid crystal display (LCD). The display screen may also include touch screen capabilities. The illustrated embodiment also includes an input device 327 operatively coupled to the input/output device controller 325. The input device 327 can be, for example, an external or integrated keyboard or cursor control pad.

The storage device controller 330 can be used to interface the processor 315 to various memory or storage devices. In the illustrated embodiment, an optional internal storage device 337 is shown for storing software applications, network parameters, user data, system configuration, and the like. In a typical thin client computing environment, the computing device 105 communicates with the servers 250, 255 for data storage functions. As one skilled in the art will appreciate, the internal storage device 337 can be any suitable storage medium, such as magnetic, optical, or electrical storage. Additionally, the internal storage device 337, the memory 320, or the flash memory 322 may store and retrieve information that is used by one or more of the functional modules described below and with reference to FIG. 4.

The communications interface 335 provides bidirectional data communication coupling for the computing device 105. The communications interface 335 can be functionally coupled to the network 280. In one embodiment, the communications interface 335 provides one or more input/output ports for receiving electrical, radio frequency, or optical signals and converts signals received on the port(s) to a format suitable for transmission on the connection network 310. The communications interface 335 can include a radio frequency modem and other logic associated with sending and receiving wireless or wireline communications. For example, the communications interface 335 can provide an Ethernet interface, Bluetooth, and/or 802.11 wireless capability for the computing device 105.

1. Program Code Modules

Figure 4:
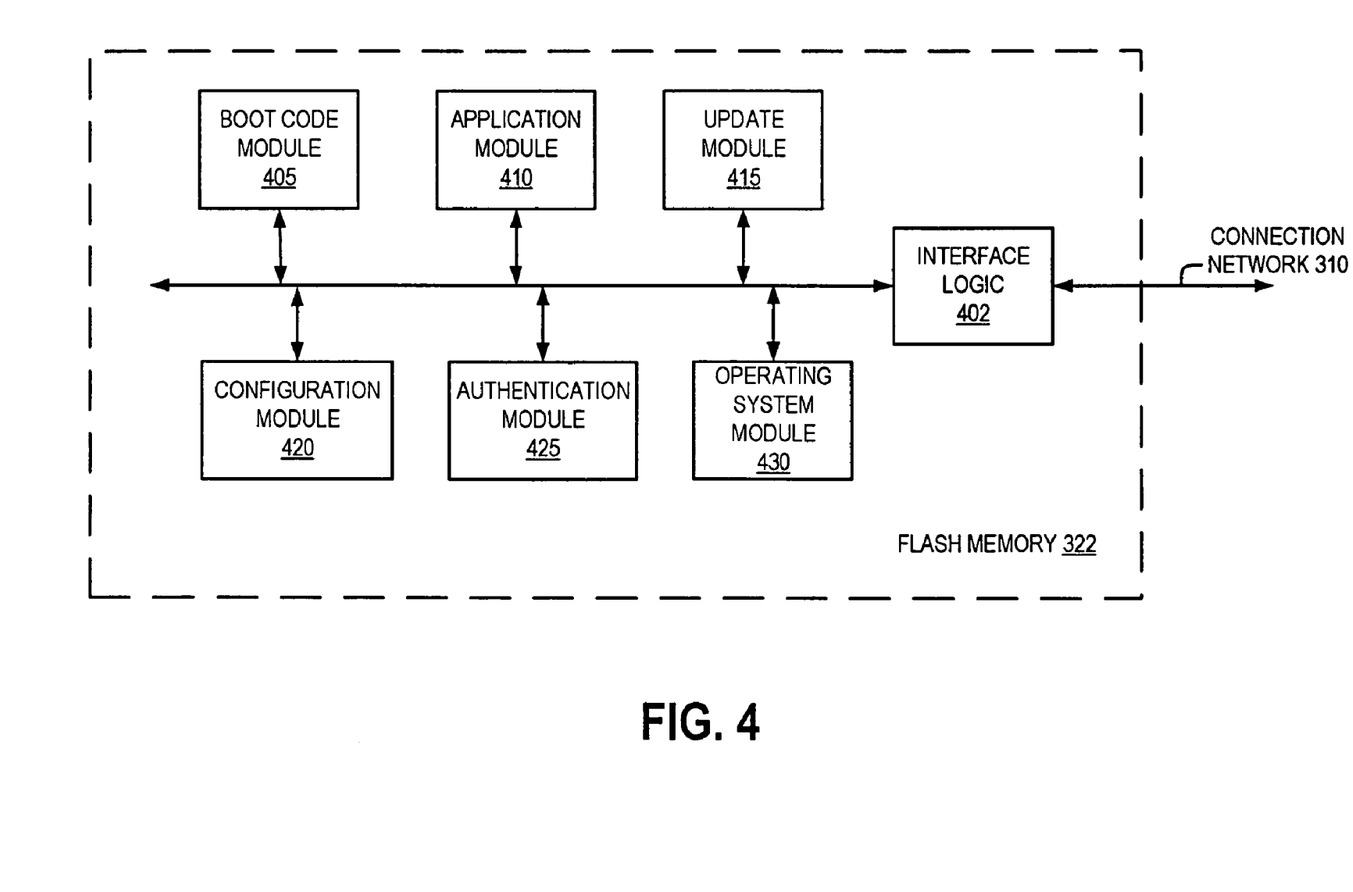
FIG. 4 illustrates program code modules for an embodiment of the present invention.

FIG. 4 illustrates program code modules for an embodiment of the present invention. The illustrated embodiment includes an interface logic 402, a boot code module 405, an application module 410, an update module 415, a configuration module 420, an authentication module 425, and an operating system module 430. The modules 405, 410, 415, 420, 425, 430 are communicatively coupled to the interface logic 402. In an embodiment, the interface logic 402 receives memory address data via the connection network 310. The interface logic 402 also provides program instructions to the processor 315 via the connection network 310.

The modules 405, 410, 415, 420, 425, 430 include program instructions that can be executed on, for example, the processor 315 to implement the features or functions of the present disclosure. The modules 405, 410, 415, 420, 425, 430 are typically stored in a memory, such as the memory 320 or the flash memory 322. As described above, the program instructions can be distributed on a computer readable medium, storage volume, or the storage device 150. The computer readable storage volume can be available via a public network, a private network (e.g., the network 280), or the Internet. Program instructions can be in any appropriate form, such as source code, object code, or scripting code. One skilled in the art will recognize that arrangement of the modules 405, 410, 415, 420, 425, 430 represents one example of how the features or functionality of the present disclosure can be implemented.

The boot code module 405 includes program instructions that are used to boot the computing device 105. This may include basic input/output system (BIOS) code, preboot execution environment (PXE) code, and the like. As described below, the boot code module 405 can determine an appropriate device from which to boot the computing device 105. For example, the boot code module 405 can include functionality for loading a universal serial bus (USB) driver to enable the computing device 105 to access the storage device 150 during the boot process. Additional details on the boot process are described below and with reference to FIG. 10.

The application module 410 includes program instructions for software applications. The application module 410 may include a customized software application load. The storage device 150 can be distributed with customizations that are loaded into the application module 410.

The update module 415 includes program instructions for updating the configuration of the computing device 105. The update module 415 may operate in conjunction with the other modules 405, 410, 420, 425, 430 in order to overwrite or to change selectable portions of the program instructions. For example, the update module 415 may be responsible for applying service packs or adding additional functionality to the operating system module 430.

The configuration module 420 may operate in conjunction with the application module 410 in order to provide configuration information to the software applications that execute on the computing device 105. The configuration module 420 may also be used to adjust system settings for the computing device 105. As one skilled in the art will appreciate, the computing device 105 may include numerous user-selectable settings that require configuration for efficient standalone or networked operation. In one embodiment, the configuration module 420 reads instructions from an attached storage device 150. These instructions may be program instructions, configuration scripts, and the like.

The authentication module 425 provides services to validate, authenticate, or authorize the storage device 150 or the data stored therein. In one embodiment, the authentication module 425 can receive an authentication credential that is used to decrypt the image. The storage device 150 may contain encrypted data in order to protect sensitive contents during distribution to the customer's premises. An access protection password or other credential that is used to unlock the storage device 150 may be used instead of or in addition to encrypting the contents. For example, a USB mass storage device may include a password-based authentication process that unlocks the contents of the device. The user can provide the password in an interactive user interface or the password can be obtained from the flash memory 322 or other component of the computing device 105.

The operating system module 430 represents a conventional operating system for a computing device, such as a personal computer, handheld, or embedded device. Example operating systems include Microsoft Windows XP and Windows Mobile (which are commercially available from Microsoft Corp., Redmond, Wash.). The operating system module 430 provides an application programming interface (API) through which the modules 405, 410, 415, 420, 425 or other application programs interact with the computing device 105. For example, the application module 410 calls a function of the operating system module 430 in order to display an element on the display screen.

C. Methods

Figure 5:
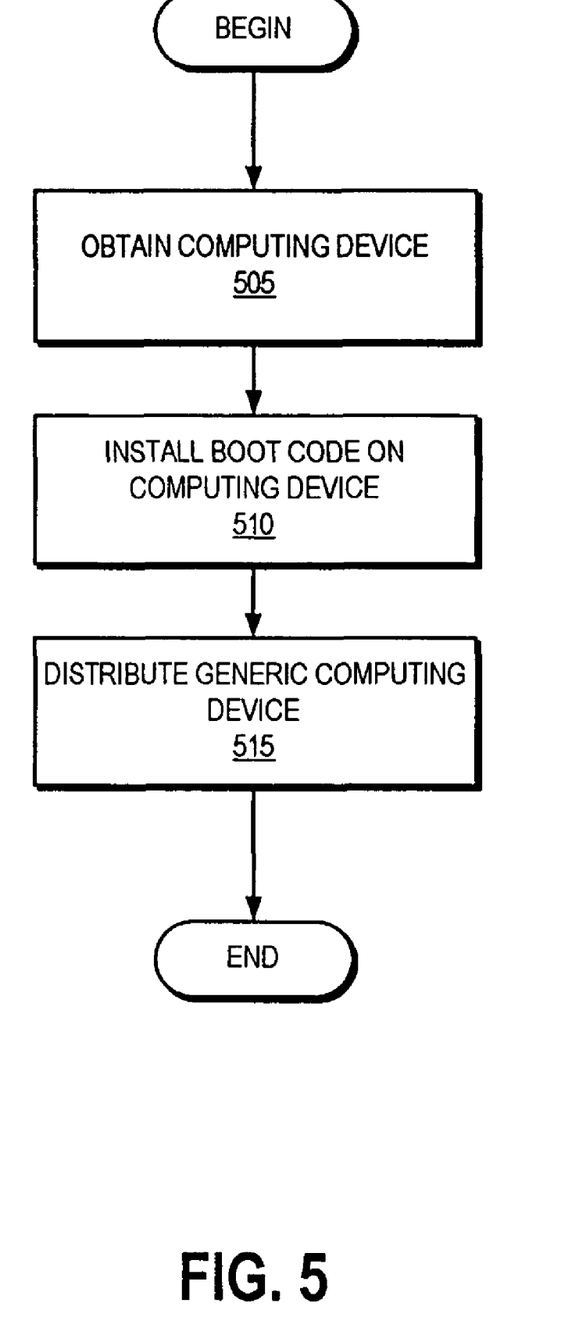
FIG. 5 is a flowchart illustrating a method for preparing a computing device for distribution according to an embodiment of the present invention.

FIG. 5 is a flowchart illustrating a method for preparing a computing device for distribution according to an embodiment of the present invention. The illustrated method beings with obtaining 505 the computing device 105. Next, boot code is installed 510 on the computing device 105. The boot code can be installed during manufacture of the computing device 105 or afterwards. In one embodiment, the boot code includes program instructions for accessing the storage device 150 via the input/output device controller 325. The boot code may be stored in the flash memory 322 or other suitable device.

The computing device 105 configured with the boot code may be referred to as a generic computing device because the computing device 105 is not configured for any particular user. The boot code represents a minimal set of functionality that the computing device 105 uses to access the storage device 150. The storage device 150 typically provides an image that contains customized software applications or other functionality. As described in further detail below, the boot code instructs the computing device 105 to read the image and to store the image for future use.

Once configured in the generic state, the computing device 105 is distributed 515 to a warehouse or to the customer's premises. One advantage of the present invention is that the system firmware or other software that the computing device 105 needs for proper operation can be conveniently distributed with the storage device 150. Therefore the generic computing device can be shipped to the customer and be configured on-site with the storage device 150.

Figure 6:
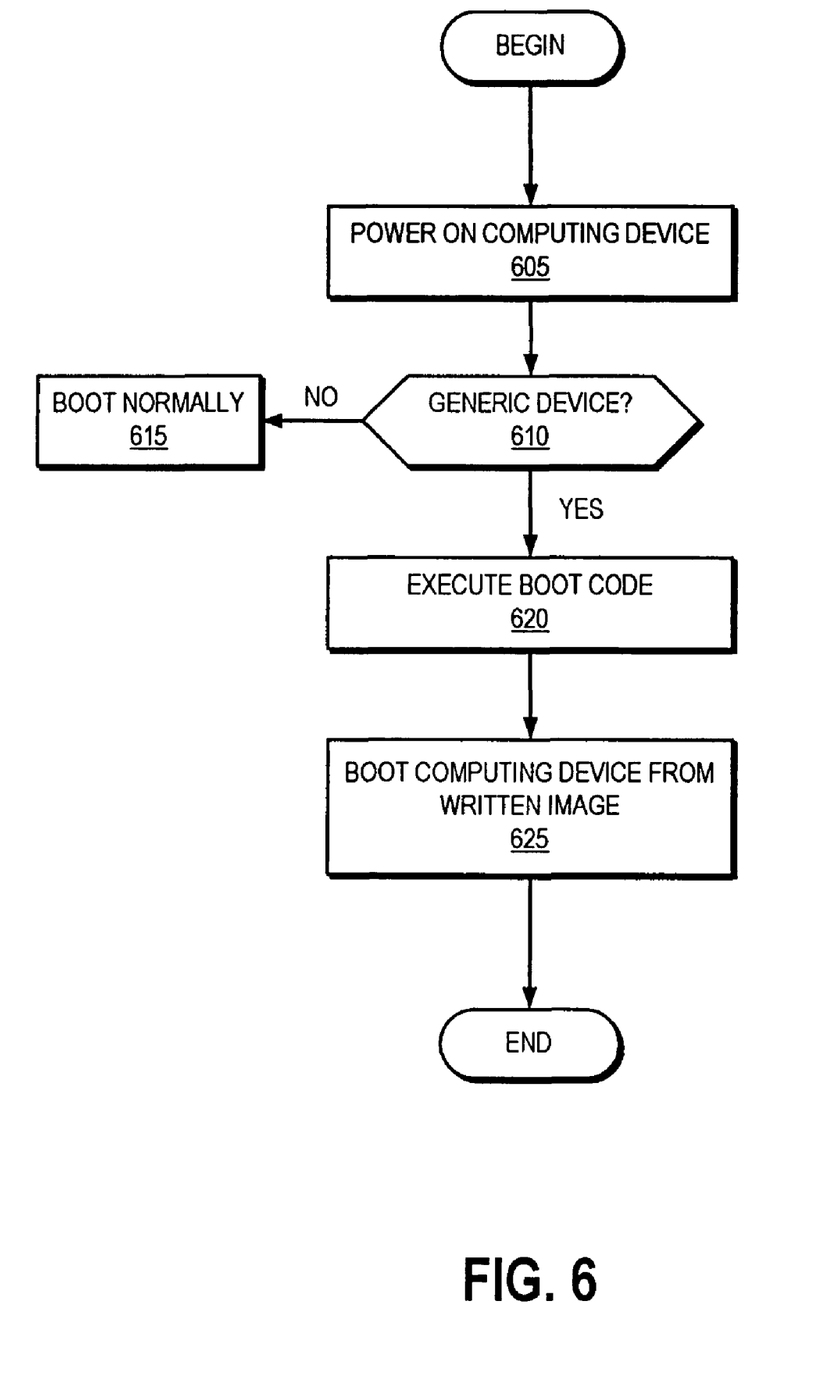
FIG. 6 is a flowchart illustrating a method for imaging a computing device according to an embodiment of the present invention.

FIG. 6 is a flowchart illustrating a method for imaging a computing device according to an embodiment of the present invention. The illustrated method begins with powering on 605 the computing device 105. The method then determines whether the computing device 105 is in a generic configuration state (i.e., only minimal boot code is loaded). If the computing device 105 has already been configured for the customer's use, the method boots 615 the computing device 105 normally. A normal boot may be accomplished by executing a portion of the contents of the flash memory 322 or the storage device 150 without updating or writing the system firmware or image.

If the computing device 105 is generic, then the method executes 620 the boot code. As described in further detail below and with reference to FIG. 7, the boot code accesses configuration information from the storage device 150 and applies the configuration information to the computing device 105. After the configuration information is applied (e.g., an image is written to flash memory 322), the computing device 105 boots 625 using the written image.

Figure 7:
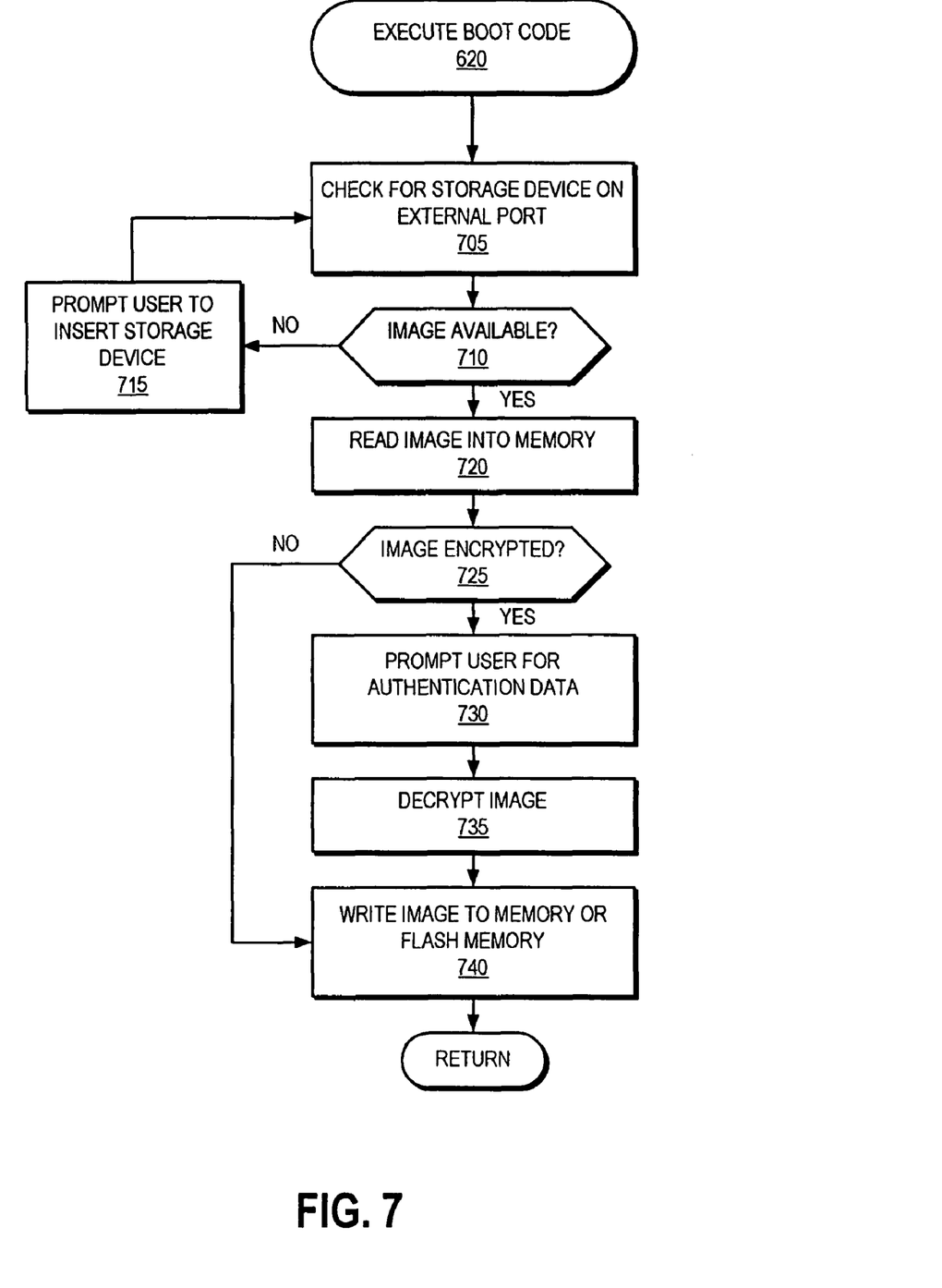
FIG. 7 is a flowchart illustrating a method for executing boot code according to an embodiment of the present invention.

FIG. 7 is a flowchart illustrating a method for executing boot code according to an embodiment of the present invention. The illustrated method begins with checking 705 the storage device 150 on the expansion port 110. If the storage device 150 is found, it is mounted or otherwise made accessible to the computing device 105. The method then determines 710 whether an image is available on the storage device 150. If the image is not available or the storage device 150 is not found on the expansion port 110, the user is prompted 715 to insert the storage device 150. In the case of a generic computing device including only minimal boot code, the computing device 105 is distributed with limited functionality. That is, the computing device 105 needs to load an image from the storage device 150 before it can proceed further. Accordingly, the method returns to checking 705 the expansion port 110 for the storage device 150.

If an image is available, it is read 720 into memory 320. Of course, the image may also be read into another suitable storage device such as the flash memory 322. The method then determines 725 if the image is encrypted. If the image is encrypted, the method prompts 720 the user for authentication data, such as a password or other credential. The image is decrypted 735 using the authentication data. If the image is not encrypted or after decryption, the image is written 740 into the memory 320 or the flash memory 322 and the method returns to the calling process.

One skilled in the art will recognize that writing the image to flash memory 322 is advantageous because the flash memory 322 is nonvolatile. As described above, the computing device 105 can then boot or reboot using the written image.

One feature of the present invention is the ability to generate a custom image for deploying the computing device 105. That is, the computing device 105 may be stored in a generic state and then loaded with a custom software configuration at the customer's premises. As noted above, an image can be generated that includes a custom software application load as well as operating system software and system firmware. The use of the storage device 150 to distribute an easily loadable image avoids the drawbacks associated with storing preconfigured computing devices that are awaiting shipment to customers. The computing device 105 and the storage device 150 may be packaged separately or together for distribution to the customer.

Figure 8:
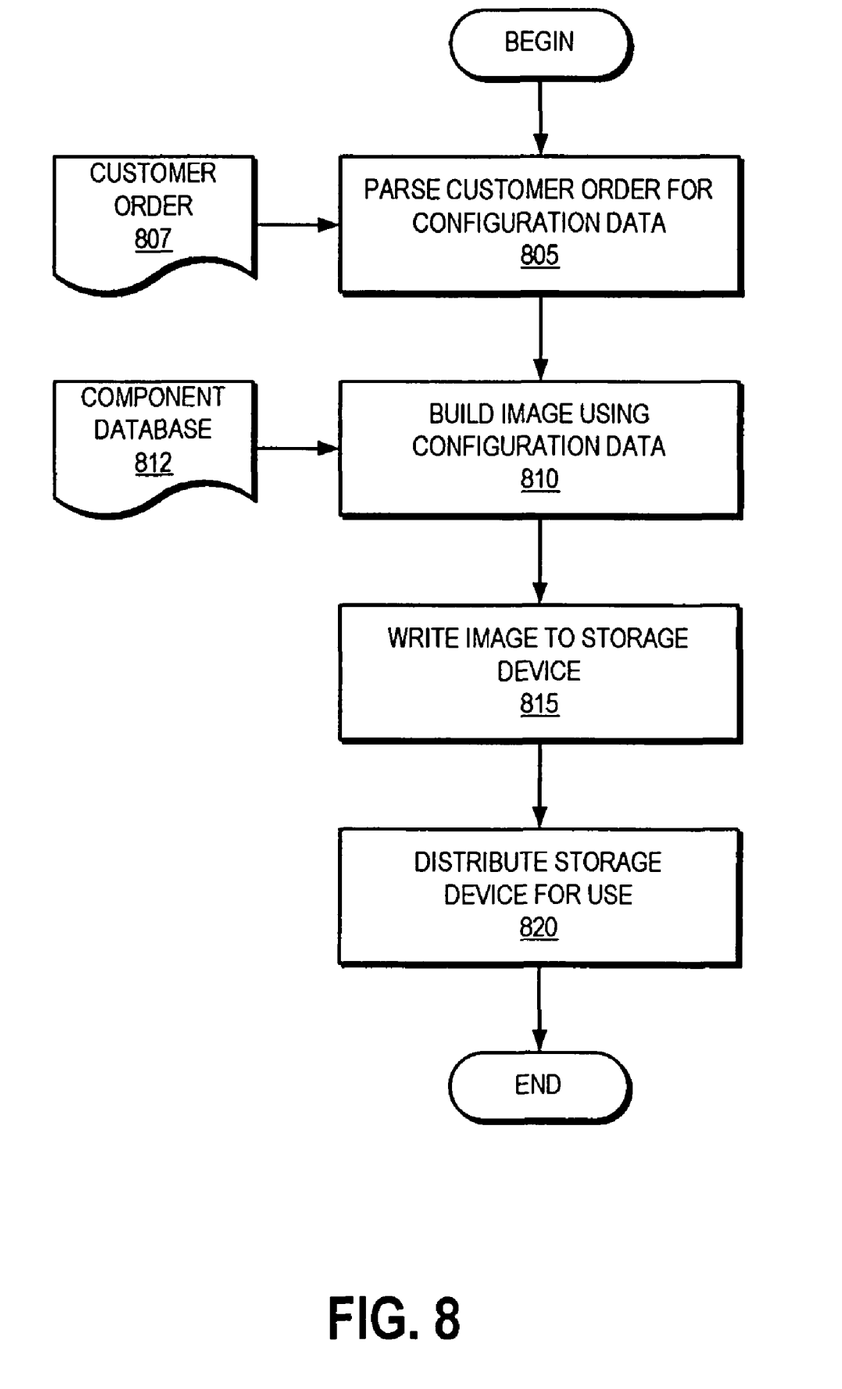
FIG. 8 is a flowchart illustrating a method for customizing an image according to an embodiment of the present invention.

FIG. 8 is a flowchart illustrating a method for customizing an image according to an embodiment of the present invention. The illustrated method begins with parsing 805 a customer order 807 for configuration data. The customer order 807 may include a specification of the computing device 105 as well as the software that the customer wants to have loaded onto the computing device 105. Using the configuration data, the method builds 810 an image. A component database 812 can be queried for software modules or other data needed for the image. For example, if a customer purchases a license for a word processing application, the component database 812 can provide a word processing module that can be integrated with other modules (e.g., operating system) to form a complete system image.

In another embodiment, the component database 812 can provide complete system images for certain predefined system option packages. For example, if the customer order 807 indicates "system type 1," a corresponding predefined image can be retrieved from the component database 812.

After the image is built 810, the image is written 815 to the storage device 150. As described above, access protection or encryption features may also be added to the image. The storage device 150 is then distributed 820 to the customer or user. One advantage of the present invention is that the storage device 150 is compact and lightweight which contributes to easy packaging and to inexpensive shipping costs.

Figure 9:
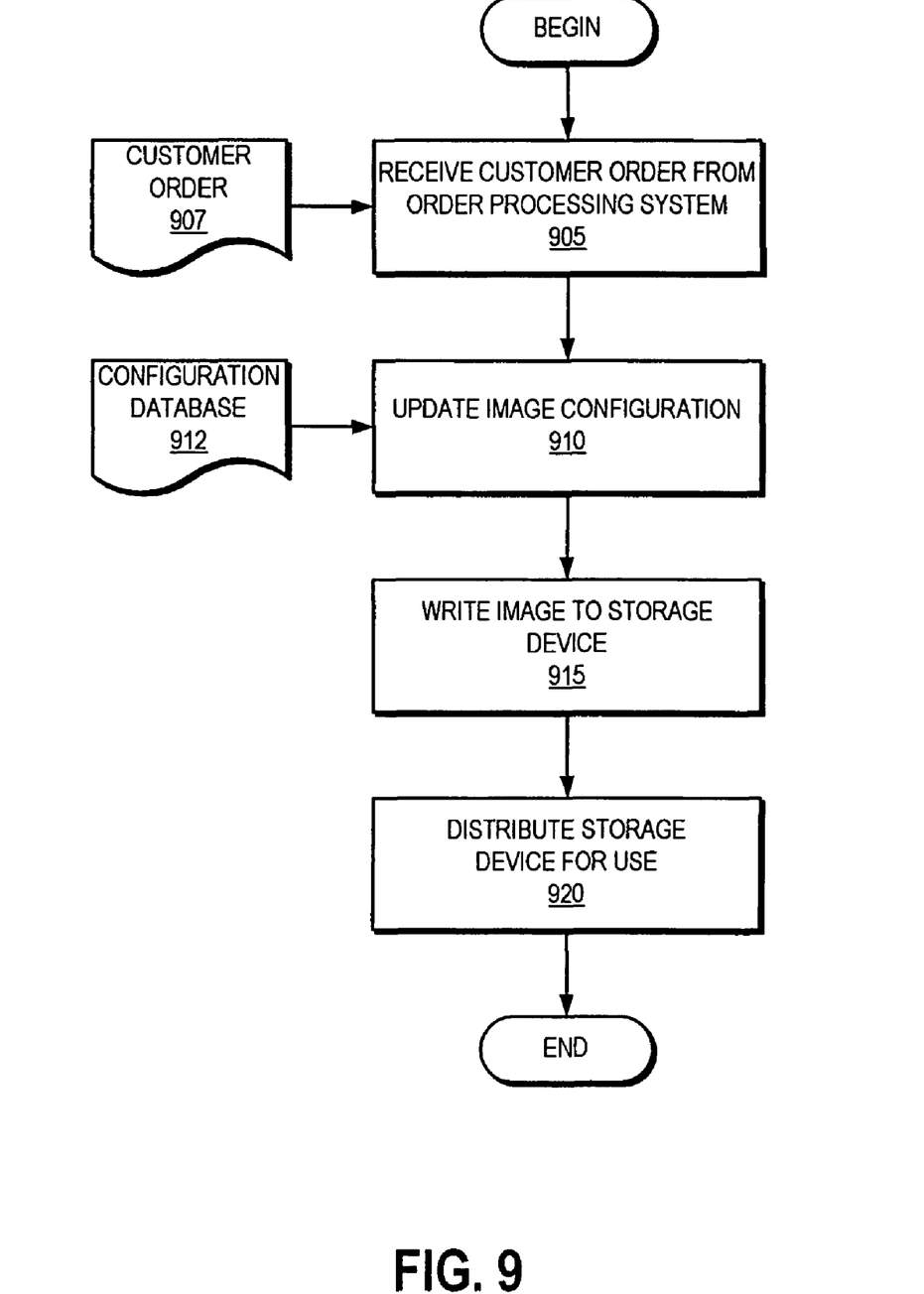
FIG. 9 is a flowchart illustrating a method for customizing an image according to another embodiment of the present invention.

FIG. 9 is a flowchart illustrating a method for customizing an image according to another embodiment of the present invention. In the illustrated method begins with receiving 905 a customer order 907 from an order processing system. The order processing system can be a conventional order entry software application or an Internet customer service interface. The customer order 907 may include a specification of additional features that the customer wants to have loaded onto the computing device 105. Using the specification, the method constructs an update image 910. A configuration database 912 can be queried for software modules or other data needed for the update image. For example, if a customer purchases an additional client license for a server-based software application, the configuration database 912 can provide the license file that is needed to activate the software on the computing device 105. The license file can then be integrated into an update image 910.

The image is then written 915 to the storage device 150. As described above, access protection or encryption features may also be added to the image. The storage device 150 is then distributed 920 to the customer or user. To update the computing device 105, the customer or user can insert the storage device 150 into the expansion port 110. The update module 415 can access the update image and make the necessary changes to the computing device 105.

Figure 10:
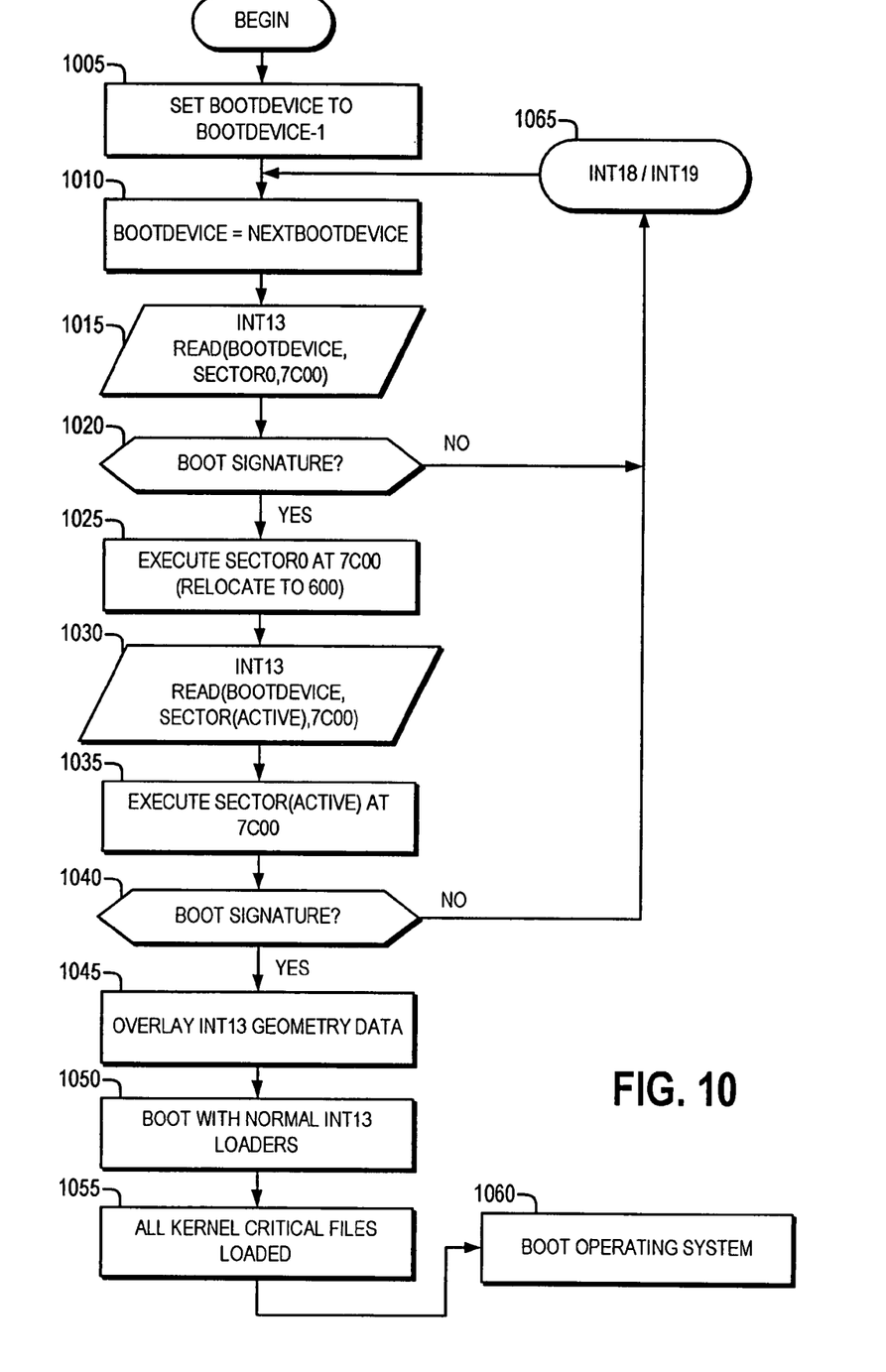
FIG. 10 is a flowchart illustrating a method for booting a computing device according to an embodiment of the present invention.

FIG. 10 is a flowchart illustrating a method for booting a computing device according to an embodiment of the present invention. As described above, in one aspect of the present invention, a generic computing device executes boot code to acquire a system image from an attached storage device. In another aspect, the image is executed from the attached storage device. In either aspect, the computing device 105 may access or read from the storage device 150 in a basic input/output system (BIOS) environment or preboot execution environment. The illustrated method provides an example for accessing the storage device 150 (e.g., a USB mass storage device) in a conventional Intel architecture personal computer using a standard boot entry point.

The illustrated method generally iterates though a list of boot devices until a boot event occurs or the list is exhausted. At step 1005, the bootdevice is set to bootdevice-1. At step 1010, the next bootdevice is selected. Using an interrupt 13 call, sector 0 of the selected bootdevice is read 1015. The method then determines 1020 whether sector 0 contains a valid boot signature. If the boot signature does not exist, the method repeats by issuing 1065 an interrupt 18/interrupt 19 call on the next bootdevice.

If the boot signature exists, then the selected bootdevice's sector 0 data is placed into memory and executed 1025. The sector 0 code in turn loads 1030 the first sector of the active partition and executes 1035 this code. If the first sector of the active partition does not contain a valid boot signature 1040, then the method repeats by issuing 1065 an interrupt 18/interrupt 19 call on the next bootdevice.

In the illustrated embodiment, the method overlays 1045 interrupt 13 geometry data. Depending on the boot environment, the storage device 150 may be limited to 1.44 Mbytes of addressing capability, which corresponds to the capacity of legacy floppy disk drives. However, the method may read the BIOS parameter block (BPB) to obtain the parameters needed to address additional areas of the storage device 150 (e.g., the number of heads, sectors, and cylinders).

The information from the BPB may be communicated to the runtime application (or loader) by intercepting interrupt 13 commands that identify the selected bootdevice's geometry values and by replacing the limited values with the actual ones. The overlay need only intercept a handful of functions and permit the others to operate in the standard fashion. Again, this can be accomplished by an interrupt 13 interception layer that permits read/write operations but reports drive information from another source (e.g., the BPB or other data area). This enables the boot loaders to read an entire device, rather than restricting read operations to a limited region (generally 1.44 Mbytes in size). The method then boots 1050 with a normal interrupt 13 loader and to load 1055 the kernel files. The kernel can then boot 1060 the operating system.

One advantage of the illustrated method is that it can enable the computing device 105 to access the storage device 150 using a legacy or preexisting boot interface. That is, the computing device 105 may be able to access a flash memory-based USB mass storage device using USB-HDD (hard disk drive) or USB-FDD (floppy disk drive) BIOS settings or bootdevices. In another embodiment, a USB-ZIP bootdevice may provide the ability to obtain data from the storage device 150 from sectors outside the standard BIOS's restricted access region without the interrupt 13 overlay described above.

Having described embodiments of computing device deployment using mass storage device (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A method for imaging a computing device from an attached storage device or providing access to the attached storage device, the method comprising steps of:

determining whether to boot the computing device from the attached storage device, wherein the determining step comprises:

comparing an image on the attached storage device with an installed image in a memory of the computing device;

parsing the image on the attached storage device for a boot flag, wherein the boot flag indicates at least one condition for booting the image; and evaluating the at least one condition;

responsive to the determining, executing boot code on the computing device to acquire the image from the attached storage device; and booting the computing device using the acquired image.

2. The method according to claim 1, wherein the executing step comprises acquiring the image from the attached storage device which comprises a flash memory mass storage device which is attached to a universal serial bus port.

3. The method according to claim 1, wherein the determining step further comprises:

accessing the installed image in the memory of the computing device; and identifying the image on the attached storage device.

4. The method according to claim 1, wherein the booting step comprises:

loading the image from the attached storage device into a computing device memory; and determining whether the image requires authentication.

5. The method according to claim 1, further comprising:

receiving authentication data; and decrypting the image using the authentication data.

6. The method according to claim 5, wherein the receiving step comprises receiving the authentication data from a user responsive to determining whether the image requires authentication.

7. A system for imaging a computing device from an attached storage device or providing access to the attached storage device, the system comprising:
   means for determining whether to boot the computing device from the attached storage device, wherein the means for determining comprises:
      means for comparing an image on the attached storage device with an installed image in a memory of the computing device;
      means for parsing the image on the attached storage device for a boot flag, wherein the boot flag indicates at least one condition for booting the image; and
      means for evaluating the at least one condition;
   responsive to the determining means, means for executing boot code on the computing device to acquire the image from the storage device; and
   means for booting the computing device using the acquired image.

8. The system according to claim 7, wherein the means for executing comprises means for acquiring the image from the attached storage device which comprises a flash memory mass storage device which is attached to a universal serial bus port.

9. The system according to claim 7, wherein the means for determining further comprises:
   means for accessing the installed image in the memory of the computing device; and
   means for identifying the image on the attached storage device.

10. The system according to claim 7, wherein the means for booting comprises:
    means for loading the image from the attached storage device into a computing device memory; and
    means for determining whether the image requires authentication.

11. The system according to claim 7, further comprising:
    means for receiving authentication data; and
    means for decrypting the image using the authentication data.

12. The system according to claim 11, wherein the means for receiving comprises means for receiving the authentication data from a user responsive to determining whether the image requires authentication.

13. A computer readable storage device encoded with instructions executable by a processor, the instructions comprising code for:
    determining whether to boot a computing device from an attached storage device, wherein the code for determining comprises code for:
       comparing an image on the attached storage device with an installed image in a memory of the computing device;
       parsing the image on the attached storage device for a boot flag, wherein the boot flag indicates at least one condition for booting the image; and
       evaluating the at least one condition;
    responsive to the determining, executing boot code on the computing device to acquire the image from the attached storage device; and
    booting the computing device using the acquired image.

14. The computer readable storage device according to claim 13, wherein the code for executing comprises code for acquiring the image from the attached storage device which comprises a flash memory mass storage device which is attached to a universal serial bus port.

15. The computer readable storage device according to claim 13, wherein the code for determining further comprises code for:
    accessing the installed image in the memory of the computing device; and
    identifying the image on the attached storage device.

16. The computer readable storage device according to claim 13, wherein the code for booting comprises code for:
    loading the image from the attached storage device into a computing device memory; and
    determining whether the image requires authentication.

17. The computer readable storage device according to claim 13, wherein the instructions further comprise code for:
    receiving authentication data; and
    decrypting the image using the authentication data.

18. The computer readable storage device according to claim 17, wherein the code for receiving comprises code for receiving the authentication data from a user responsive to determining whether the image requires authentication.

19. A system for imaging or providing access to a computing device from an attached storage device or providing access to the attached storage device, the system comprising:
    a processor configured to determine whether to boot the computing device from the attached storage device, configured to execute boot code on the computing device to acquire the image from the attached storage device in response to determining, and configured to boot the computing device using the acquired image,
    wherein to determine whether to boot the computing device from the attached storage device, the processor is configured to compare an image on the attached storage device with an installed image in a memory of the computing device, the processor is configured to parse the image on the attached storage device for a boot flag, wherein the boot flag indicates at least one condition for booting the image, and the processor is configured to evaluate the at least one condition.

20. The system according to claim 19, wherein to execute boot code, the processor is configured to acquire the image from the attached storage device which comprises a flash memory mass storage device which is attached to a universal serial bus port.

21. The system according to claim 19, wherein to determine whether to boot the computing device from the attached storage device, the processor is configured to access the installed image in the memory of the computing device and configured to identify the image on the attached storage device.

22. The system according to claim 19, wherein to boot the computing device, the processor is configured to load the image from the attached storage device into a computing device memory and configured to determine whether the image requires authentication.

23. The system according to claim 19, wherein the processor is configured to receive authentication data and configured to decrypt the image using the authentication data.

24. The system according to claim 23, wherein to receive the authentication data, the processor is configured to receive the authentication data from a user responsive to determining whether the image requires authentication.

* * * * *